L. J. ATWOOD.

LAMPS.

No. 7,278. Reissued Aug. 29, 1876.

Witnesses

Chas H. Smith

Harold Serrell

Inventor

Lewis J. Atwood per Lemuel W. Serrell atty

N. PETERS, PHOTO-LITHOGRAPHER, WASHINGTON, D. C.

UNITED STATES PATENT OFFICE.

LEWIS J. ATWOOD, OF WATERBURY, CONNECTICUT.

IMPROVEMENT IN LAMPS.

Specification forming part of Letters Patent No. 80,111, dated July 21, 1868; reissue No. 7,278, dated August 29, 1876; application filed March 4, 1875.

*To all whom it may concern:*

Figure 1:
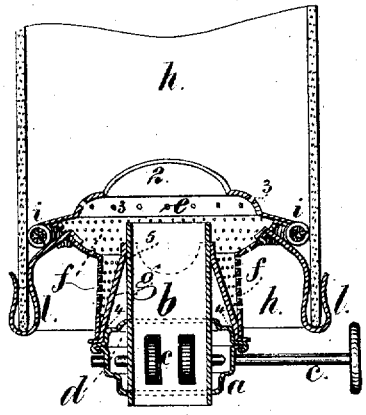
Figure 3:
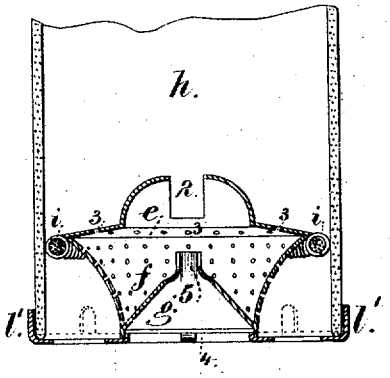
Figure 2:
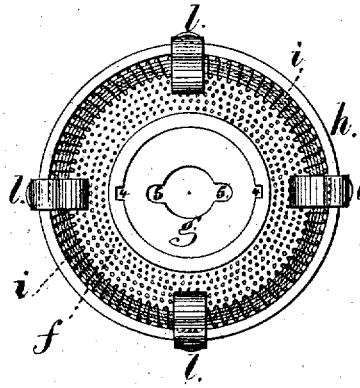

Be it known that I, LEWIS J. ATWOOD, of Waterbury, in the State of Connecticut, have invented an Improvement in Lamps, of which the following is a specification:

Figure 1 is a vertical section of the said improved lamp. Fig. 2 is an inverted plan of the removable chimney-holder and draft-regulator; and Fig. 3 is a section of a modification, in the shape of the foraminous portion of the draft-regulator, and in the chimney-holder.

Similar marks of reference denote the same parts.

I make use of an elevated draft-plate within the glass chimney, of a character corresponding generally with those shown in Letters Patent granted to me January 21, 1868, and October 13, 1863.

My present improvement consists in a draft-regulator within the lower end of the glass chimney, consisting of a draft-plate with a flame-slot, in combination with a foraminous inclosure below the draft-plate and within the chimney; and I employ a coupling to connect the chimney-holder and ratchet-cap, and combine with the draft-plate spring chimney-clamps.

The foraminous inclosure regulates the supply of air to the flame. The lower part of the glass chimney shields the same from sudden currents of air, and the said glass chimney, being exposed at its base to the action of air, and but little acted upon by heat, can be freely handled in removing the parts to give access to the wick in lighting or taking a light from said wick.

In the drawing, *a* is the screw for attaching to the reservoir. *b* is the wick-tube; *c*, the wick-raiser, and *d* a cap surrounding the wick-tube, and with the portion *a* forming an inclosure for the ratchet or wick-raiser *c*.

The draft-regulator is formed of the draft-plate *e*, in which is a flame-slot, 2, and the edge of said draft-plate is provided with a helix, *i*, of wire, as in my aforesaid patent of January 21, 1868; or any other internal spring chimney-clamp might take the place of this helix, if desired; and there are openings between the edge of this draft-plate *e* and the interior of the chimney, to allow air to pass at this point, said openings in this case being between the coils of the helix.

I prefer to perforate the draft-plate *e* with air-holes at 3 to admit an external draft to the flame above the flame-slot.

The foraminous casing or inclosure *f* is around the upper part of the wick-tube, and it is shown as extending from the draft-plate *e* to the burner-coupling *g*. It may be conical or flaring, or of other suitable shape, to allow the necessary air-space between the same and the interior of the lower part of the chimney *h*. I have shown different shapes to this casing *f* in Figs. 1 and 3.

The burner-coupling *g* is made of a diameter at its base to set upon the cap *d*, at which point I form one or more notches in the said coupling *g*, as at 4, taking corresponding projections upon said cap *d*, or the reverse, the object of these being to prevent strain coming upon the wick-tube to twist the same, if the draft-regulator is taken hold of in screwing in or unscrewing the burner from the reservoir.

The coupling *g* is tapered sufficiently to direct the draft-regulator to the right point relatively to the wick-tube, when said draft-regulator is placed thereon; and at the sides of the aperture in this tapering coupling, through which the wick-tube passes, I form the concave clips 5 5, to take the edges of the wick-tube and form a sufficient friction to hold said draft-regulator in place upon the wick-tube or burner while being transported.

The chimney passes down outside the draft-plate and surrounds the entire draft-regulator, and is supported at its lower end by the hooks *l l*, Figs. 1 and 2, suspended from the under side of the draft-plate or from the foraminous casing, or formed as a ring chimney-holder, *l'*, as in Fig. 3.

The hooks *l l* form a spring chimney-holder, that clamps the chimney both inside and outside, and hence secures the same very reliably, accommodating slight variations.

The lower part of the chimney, being exposed on both sides to the free action of air, does not become heated, as in burners where the chimney rests upon the deflector, or upon a perforated draft-regulator or other partially-closed support.

Before my present invention lamp-burners had been made with a draft-plate or deflector containing a flame-slot, and located up in the chimney above the base thereof, and with the air-distributing plate near or below the base of the chimney. In these cases the base of the chimney was not open, and hence it was not kept cool by the free circulation of the atmosphere. In other cases the base of the chimney had been open and extended below the draft-plate, but without the air-distributer; hence the flame was affected by currents of atmosphere.

I claim as my invention—

1. In a lamp-burner, a draft-regulator composed of an air-distributer and draft-plate, connected together and surrounding the upper part of the wick-tube, in combination with a chimney-support below the draft-regulator, substantially as set forth.

2. An air-distributer and draft-plate or deflector surrounding the upper end of the wick-tube, in combination with spring chimney-supports below the said draft-plate and air-distributer, as set forth.

3. The combination of the elevated air-distributer and draft-plate with the chimney extending below the edges of the draft-plate, and with draft-regulating openings around the edges of the draft-plate, substantially as set forth.

4. An elevated air-distributer and draft-plate, surrounding the upper end of the wick-tube, in combination with springs between the draft-regulator and the interior of the chimney, and connected to such draft-regulator, substantially as set forth.

5. The draft-plate *e*, with a flame-slot and springs around its edges, in combination with a foraminous casing that extends from said draft-plate to the coupling *g* or ratchet-cap, substantially as specified.

6. The coupling *g*, removable from the wick-tube *b*, and ratchet-cap *d*, in combination with the foraminous air-distributer *f*, draft-plate *e*, springs *i*, and chimney-holder *l*, substantially as set forth, whereby the entire draft-regulator and chimney can be removed from the wick-tube or ratchet-cap and replaced, as set forth.

7. The coupling *g*, concave clips 5, and notch 4, in combination with the wick-tube *b* and ratchet-cap *d*, as and for the purposes specified.

Signed by me this 19th day of February, A. D. 1875.

L. J. ATWOOD.

Witnesses:
GEO. T. PINCKNEY,
CHAS. H. SMITH.